US012707421B2

(12) United States Patent
Wang et al.

(10) Patent No.: US 12,707,421 B2
(45) Date of Patent: Aug. 11, 2026

(54) NETWORK ACTION BASED ON CO-HOSTED CELLS

(71) Applicant: Telefonaktiebolaget LM Ericsson (publ), Stockholm (SE)

(72) Inventors: Kai Wang, Milton (CA); Åke Busin, Sollentuna (SE); Yunjie Lu, Shanghai (CN)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 325 days.

(21) Appl. No.: 18/550,530

(22) PCT Filed: May 4, 2021

(86) PCT No.: PCT/IB2021/053736
§ 371 (c)(1),
(2) Date: Sep. 14, 2023

(87) PCT Pub. No.: WO2022/200841
PCT Pub. Date: Sep. 29, 2022

(65) Prior Publication Data

US 2024/0298290 A1 Sep. 5, 2024

(30) Foreign Application Priority Data

Mar. 25, 2021 (WO) ................ PCT/CN2021/082896

(51) Int. Cl.
*H04W 64/00* (2009.01)
*H04W 48/08* (2009.01)

(52) U.S. Cl.
CPC ........... *H04W 64/00* (2013.01); *H04W 48/08* (2013.01)

(58) Field of Classification Search
CPC .............................. H04W 64/00; H04W 48/08
(Continued)

(56) References Cited

U.S. PATENT DOCUMENTS 7,995,988 B2 * 8/2011 Filizola ................. H04W 4/029 342/464
2010/0322079 A1 * 12/2010 Kitazoe ............. H04W 36/0088 370/332
2020/0187275 A1 * 6/2020 Lopes ..................... H04W 8/08

FOREIGN PATENT DOCUMENTS

CN 107787041 A 3/2018
CN 111935733 A 11/2020
(Continued)

OTHER PUBLICATIONS

International Search Report and Written Opinion dated Dec. 23, 2021 issued in PCT Application No. PCT/IB2021/053736 filed May 4, 2021, consisting of 14 pages.
(Continued)

*Primary Examiner* — Michael R Neff
(74) *Attorney, Agent, or Firm* — Weisberg I.P. Law, P.A.

(57) ABSTRACT

According to one embodiment, a network function node is provided. The network node function includes processing circuitry configured to receive a request for performing a network action where the request includes an access network cell identity that includes a network node identifier associated with a network node and a serving cell identifier associated with a serving cell, and a bit length of the network node identifier. The processing circuitry is configured to determine the network node identifier based at least one the bit length of the network node identifier, estimate a respective coverage area for each of the plurality of cells, estimate a coverage area of the serving cell based at least on the estimates of the respective coverage areas of the plurality of cells, and perform the requested network action based at least on the estimated coverage area of the serving cell.

25 Claims, 13 Drawing Sheets

(58) Field of Classification Search
USPC ........................................................ 455/456.1
See application file for complete search history.

(56) References Cited

FOREIGN PATENT DOCUMENTS

| | | | |
|---|---|---|---|
| WO | 03/041436 | A1 | 5/2003 |
| WO | 2006/044931 | A1 | 4/2006 |

OTHER PUBLICATIONS

3GPP TS 23.273 V16.4.0 (Jul. 2020) 3rd Generation Partnership Project; Technical Specification Group Services and System Aspects; 5G System (5GS) Location Services (LCS); Stage 2 (Release 16), consisting of 96 pages.

3GPP TS 29.572 V16.3.0 (Jun. 2020) 3rd Generation Partnership Project; Technical Specification Group Core Network and Terminals; 5G System; Location Management Services; Stage 3 (Release 16), consisting of 74 pages.

3GPP TS 29.171 V16.1.0 (Sep. 2020) 3rd Generation Partnership Project; Technical Specification Group Core Network and Terminals; Location Services (LCS); LCS Application Protocol (LCS-AP) between the Mobile Management Entity (MME) and Evolved Serving Mobile Location Centre (E-SMLC); SLS interface (Release 16), consisting of 65 pages.

* cited by examiner

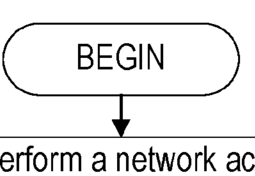

Receive a request for perform a network action where the request includes an access network cell identity that includes a network node identifier associated with a network node and a serving cell identifier associated with a serving cell, and a bit length of the network node identifier S134

Determine the network node identifier based at least one the bit length of the network node identifier S136

Identify a plurality of cells other than the serving cell that are hosted by the network node based on the determined network node identifier S138

Estimate a respective coverage area for each of the plurality of cells S140

Estimate a coverage area of the serving cell based at least on the estimates of the respective coverage areas of the plurality of cells S142

Perform the requested network action based at least on the estimated coverage area of the serving cell S144

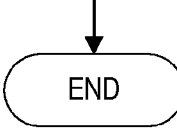

Figure 10:
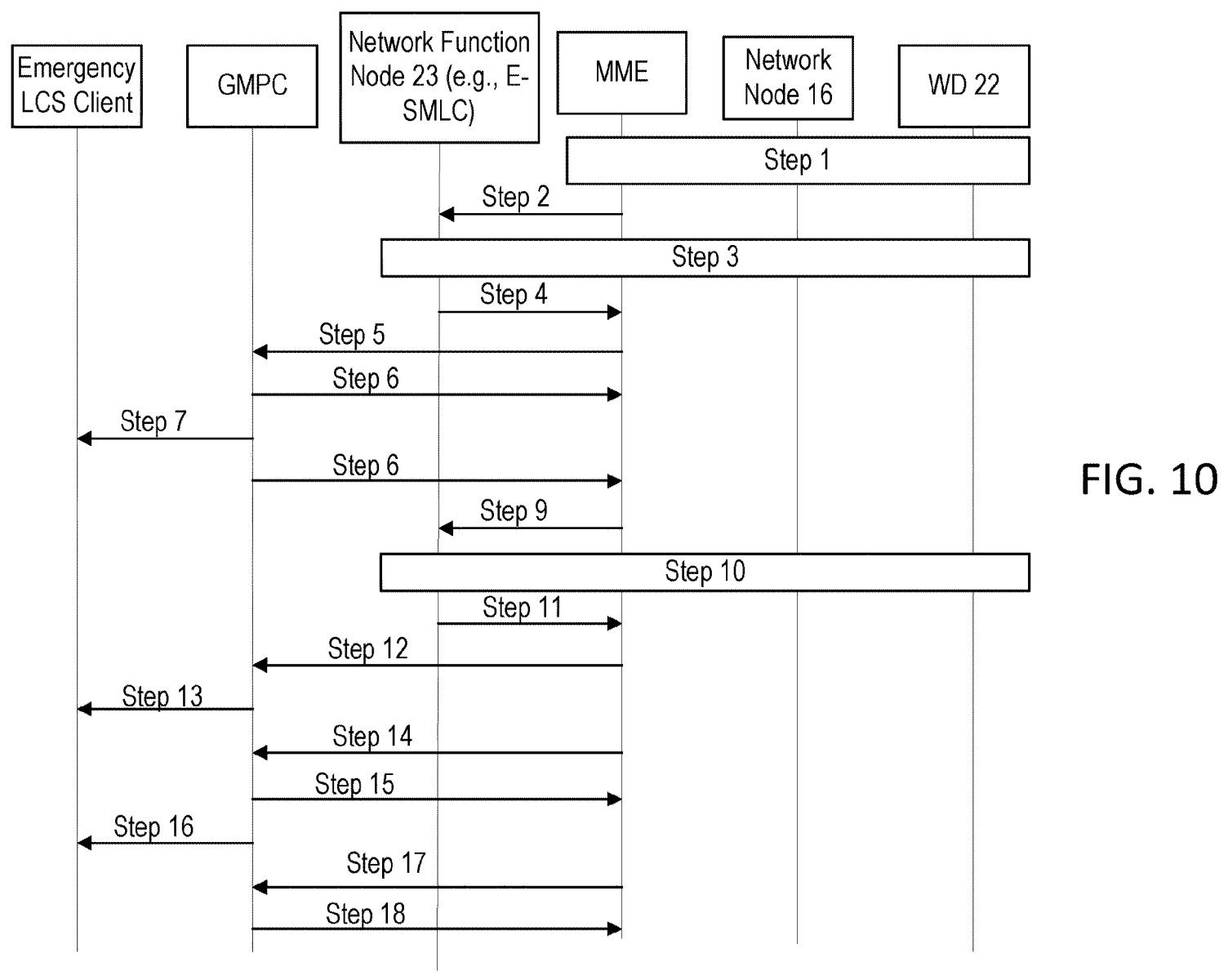

WD 22
Network Node 16
MME
Network Function Node 23 (e.g., E-SMLC)
GMPC
Emergency LCS Client Step 1
Step 2
Step 3
Step 4
Step 5
Step 6
Step 6
Step 7
Step 9
Step 10
Step 11
Step 12
Step 13
Step 14
Step 15
Step 16
Step 17
Step 18

NETWORK ACTION BASED ON CO-HOSTED CELLS

CROSS-REFERENCE TO RELATED APPLICATION

This application is a Submission Under 35 U.S.C. § 371 for U.S. National Stage Patent Application of International Application Number: PCT/IB2021/053736, filed May 4, 2021 entitled "NETWORK ACTION BASED ON CO-HOSTED CELLS," and PCT/CN2021/082896, filed Mar. 25, 2021 entitled "NETWORK ACTION BASED ON CO-HOSTED CELLS," the entirety of both of which is incorporated herein by reference.

TECHNICAL FIELD

The present disclosure relates to wireless communications, and in particular, to network actions based at least on co-hosted cell(s).

BACKGROUND

In some third generation partnership project (3GPP) based networks, positioning/location determination of a wireless device may be performed by the core network for various reasons. For example, location data may be calculated by evolved serving mobile location center (E-SMLC)/location management function (LMF) (e.g., cell global identity (CGI)/tracking area (TA), observed time different of arrival (OTDOA), assisted global navigation satellite system (A-GNSS) assistant, etc.), or device (e.g., A-GNSS based). Then E-SMLC/LMF may perform a positioning result sanity check to verify whether the location data within a coverage area of a network node. If the positioning result sanity check verifies the location data is within the coverage area of the network node, it will be returned location services application (LCS-AP) to mobility management entity (MME)/access and mobility function (AMF) over LCS-AP.

An example architecture for 3GPP LTE (also referred to as 4th Generation) positioning is illustrated in FIG. 1. In a 4th Generation (4G) positioning process, a positioning request is sent to E-SMLC message from MME is LocationRequest( ) over LCS-AP protocol. E-SMLC returns a final chosen/determined location data if the location is verified (i.e., the location data is determined to be within a coverage area of a particular cell) or corresponding error code to MME (e.g., the location is determined to not be within the coverage area). In particular, an error code may be generated if no location data is generated/received such that the sanity check cannot be performed or the sanity check failed. The communication protocol between E-SMLC and UE is LTE positioning protocol (LPP)/LPP extensions (LPPe). The communication protocol between E-SMLC and eNB is LTE positioning protocol A (LPPa).

An example architecture for LTE and 5G (5G is also referred to as "New Radio" or "NR") positioning is the 3GPP Location Services (LCS) architecture illustrated in FIG. 2. In a 5G positioning process, the positioning request sent to LMF from AMF is Nlmf_Location_DetermineLocation( ). LMF returns the final chosen location data if the location data is verified (i.e., the location data is determined to be within a coverage area of a particular cell) or corresponding error code to AMF (e.g., the location is determined to not be within the coverage area). In particular, the error code is generated if no location data is generated or the sanity check is failed. The communication protocol between E-SMLC and UE is LPP/LPPe.

Existing positioning sanity check for LCS positioning is based on the serving cell shape. For example, E-SMLC/LMF uses the location of the target device serving cell plus an offset to verify the location data of the target device. The sanity check may fail if the location data is beyond the target device serving cell shape plus offset. On the contrary, location data may be returned to MME/AMF if the location data passes sanity check, i.e., the location data is determined to be within the target device serving cell shape plus offset.

However, the existing positioning sanity check suffers from at least one issue. If the serving cell information cannot be retrieved from the E-SMLC/LMF database, the sanity check will not be able to be performed since the sanity check shape (i.e., target device serving cell shape/coverage area) cannot be determined such that the location data cannot be compared to the target device serving cell shape/coverage area.

In particular, the issue with possibly being unable to retrieve the serving cell information is described below with respect to 5G 3GPP Technical Specification (TS) 29.572. 3GPP TS 29.572 V16.3 (5G System; Location Management Services; Stage 3) defines that the serving cell NR cell identity is included in DetermineLocation Request message which is used to trigger the positioning process on positioning server LMF. However, when the LMF database does not have same cell identity, this may cause the LMF to be unable to decode the global cell identity (NR Cell Identity (NCI) from DetermineLocation message) which includes both a network node identifier (e.g., gNBid) and cell identifier (cellid). That is, the gNBid does not have a fixed position in within a 36 bit NCI that includes the gNBid and cellid, where the bit size/length of the network node identifier may vary based on the network node identity being indicated (i.e., the gNBId can vary from 22-32 bits. Therefore, if only NCI is known, it is not possible to extract the gNBId and cellid.

SUMMARY

Some embodiments advantageously provide a method and system for network actions based at least on co-hosted cell(s).

In one or more embodiments, a network function node such as a location server LMF is able to determine cells hosted by the network node as indicated in the LMF DB if, for example, the NCI is known and the size/length of the network node identifier is known, thereby allowing the network node to perform a network action even if the serving cell information is not retrievable, i.e., if LMF DB does not have/include the serving cell information.

In one or more embodiments, a change to 3GPP in accordance with some embodiments of the disclosure includes adding a gNBidlength parameter to Chapter 5.2.2.2.2 of 3GPP TS 29.572 v16.3, then the LMF will be able to decode the gNBid information and query the cells host by the same network node in its DB. For example, in 4$^{th}$ Generation (4G, also referred to as LTE), the following information for a cell is: MCC=310, MNC=310, cid=18939649. The Network unique cid (i.e., cellid or cell id) is includes the eNB id and cellid. The first 20 bits are reserved for eNB, last 8 bits are reserved for cell id. So the following cell information may be extracted:

Network unique Cell id=18939649=0x120FF01

20 first bits (5 hexadecimal digits)=0x120FF=73983 (eNBId)

8 next bits (2 hexadecimal digits)=0x01=1 (cellId)

However, in 5G, the network node (e.g., gNB) identifier length and cellid (cid) length are not fixed in NCI. The NR Cell Identity (NCI) is a 36 bit integer which consists of gNBId (22-32 bits) and cellid. So given the following information: a cell MCC=310, MNC=310, NCI=18939649, a network function node will not be able to extract the network node identifier and cid unless the length of the network node identifier is known. For example, if the Gnb_length is 22 and known, the first 22 bits of the NCI can be treated as the gNB and the last 14 bits as the cellid such that the network function node can extract them. Even once extracted using the gNB length, the system is able to perform a sanity check when serving cell information associated with a cellid is missing. Therefore, one or more embodiments described herein provide for an enhanced sanity check method for positioning based on the cells in the same network node (e.g., eNB/gNB), i.e., cells hosted by the same network node.

For example, the existing positioning sanity check for LCS positioning is based on the serving cell shape. E-SMLC/LMF uses the location of the target device serving cell and an offset to verify the location data. The sanity check may fail if the location data is beyond the coverage area/shape of the target device serving cell plus offset. On the contrary, location data may be returned to MME/AMF if it passes a sanity check.

However, the enhanced sanity check uses cells in the same network node, i.e., hosted by the network node, to perform the sanity check. The enhanced sanity check may be considered as a rough sanity check is the accuracy of the enhanced sanity check may be lower than an existing sanity check when serving cell information is available. Nevertheless, the enhanced sanity check helps prevent a position of a wireless device from not being verified by positioning server when serving cell information cannot be retrieved from E-SMLC/LMF database. Further, the enhanced sanity check may be used in case the user or wireless device does not want the more accurate sanity check (serving cell level) for LCS positionings. Further, the enhanced sanity check may be used to verify or confirm the accuracy sanity check in case the existing sanity check is performed using the wrong serving cell information.

One or more embodiments described herein provide one or more of the following advantages:

helps improve the positioning accuracy;

helps increase the positioning successful rate; and provides low complexity changes to 5G LCS architecture.

According to one aspect of the disclosure, a network function node is provided. The network function node includes processing circuitry configured to receive a request for performing a network action, the request including an access network cell identity that includes a network node identifier associated with a network node and a serving cell identifier associated with a serving cell and a bit length of the network node identifier. The processing circuitry is further configured to determine the network node identifier based at least on the bit length of the network node identifier, identify a plurality of cells other than the serving cell that are hosted by the network node based on the determined network node identifier, estimate a respective coverage area for each of the plurality of cells, estimate a coverage area of the serving cell based at least on the estimates of the respective coverage areas of the plurality of cells, and perform the requested network action based at least on the estimated coverage area of the serving cell.

According to one or more embodiments of this aspect, the processing circuitry is further configured to attempt to retrieve serving cell information using the serving cell identifier where the estimating of the coverage area of the serving cell is performed after a failure to retrieve serving cell information using the serving cell identifier. According to one or more embodiments of this aspect, the processing circuitry is further configured to attempt to retrieve serving cell information using the serving cell identifier where the estimating of the coverage area of the serving cell is performed after retrieving serving cell information using the serving cell identifier. According to one or more embodiments of this aspect, the requested network action includes determining whether an estimated wireless device position is within the estimated coverage area of serving cell.

According to one or more embodiments of this aspect, the processing circuitry is configured to respond to the request by returning estimated wireless device position for the wireless device if the estimated wireless device position is within the estimated coverage area of the serving cell. According to one or more embodiments of this aspect, the estimated coverage area of the serving cell includes a preconfigured tolerance range. According to one or more embodiments of this aspect, the estimated wireless device position is based on one of location information and measurements received from the wireless device.

According to one or more embodiments of this aspect, the requested network action includes a location services, LCS, positioning action. According to one or more embodiments of this aspect, a bit length of a network node identifier included in the access network cell identity varies based on a network node being identified where the network node identifier is undecodable from the network node identifier without the bit length of the network node identifier that is received. According to one or more embodiments of this aspect, the estimating of the coverage area of the serving cell is based at least on a lack of network node coverage, in a portion of an area served by the network node, that results from mapping the coverage area of the plurality of cells without mapping the coverage area for the serving cell. According to one or more embodiments of this aspect, at least one of the plurality of cells is a neighbor cell to the serving cell. According to one or more embodiments of this aspect, the network function node is a location management function, LMF, node.

According to another aspect of the disclosure, a method implemented by a network function node is provided. A request for performing a network action is received where the request includes an access network cell identity that includes a network node identifier associated with a network node and a serving cell identifier associated with a serving cell and a bit length of the network node identifier. The network node identifier is determined based at least one the bit length of the network node identifier. A plurality of cells other than the serving cell that are hosted by the network node are identified based on the determined network node identifier. A respective coverage area for each of the plurality of cells is estimated. A coverage area of the serving cell is estimated based at least on the estimates of the respective coverage areas of the plurality of cells. The requested network action is performed based at least on the estimated coverage area of the serving cell.

According to one or more embodiments of this aspect, an attempt is performed to retrieve serving cell information using the serving cell identifier where the estimating of the coverage area of the serving cell is performed after a failure to retrieve serving cell information using the serving cell identifier. According to one or more embodiments of this aspect, an attempt is performed to retrieve serving cell information using the serving cell identifier where the estimating of the coverage area of the serving cell is performed after retrieving serving cell information using the serving cell identifier. According to one or more embodiments of this aspect, the requested network action includes determining whether an estimated wireless device position is within the estimated coverage area of serving cell.

According to one or more embodiments of this aspect, the estimated coverage area of the serving cell includes a preconfigured tolerance range. According to one or more embodiments of this aspect, the request is responded to by returning estimated wireless device position for the wireless device if the estimated wireless device position is within the estimated coverage area of the serving cell. According to one or more embodiments of this aspect, the estimated wireless device position is based on one of location information and measurements received from the wireless device.

According to one or more embodiments of this aspect, the requested network action includes a location services, LCS, positioning action. According to one or more embodiments of this aspect, a bit length of a network node identifier included in the access network cell identity varies based on a network node being identified where the network node identifier is undecodable from the network node identifier without the bit length of the network node identifier that is received. According to one or more embodiments of this aspect, the estimating of the coverage area of the serving cell is based at least on a lack of network node coverage, in a portion of an area served by the network node, that results from mapping the coverage area of the plurality of cells without mapping the coverage area for the serving cell.

According to one or more embodiments of this aspect, at least one of the plurality of cells is a neighbor cell to the serving cell. According to one or more embodiments of this aspect, the network function node is a location management function, LMF, node.

According to another aspect of the disclosure, a computer readable storage medium including instructions, which when executed by a processor, cause the processor to receive a request for performing a network action where the request includes an access network cell identity that includes a network node identifier associated with a network node and a serving cell identifier associated with a serving cell and a bit length of the network node identifier. The processor is further caused to determine the network node identifier based at least one the bit length of the network node identifier, identify a plurality of cells other than the serving cell that are hosted by the network node based on the determined network node identifier, estimate a respective coverage area for each of the plurality of cells, estimate a coverage area of the serving cell based at least on the estimates of the respective coverage areas of the plurality of cells, and perform the requested network action based at least on the estimated coverage area of the serving cell.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 9 is a flowchart of an example process in a network function node according to some embodiments of the present disclosure;

FIG. 10 is a signaling diagram of end to end flow of an emergency positioning according to some embodiments of the present disclosure;

DETAILED DESCRIPTION

Figure 1:
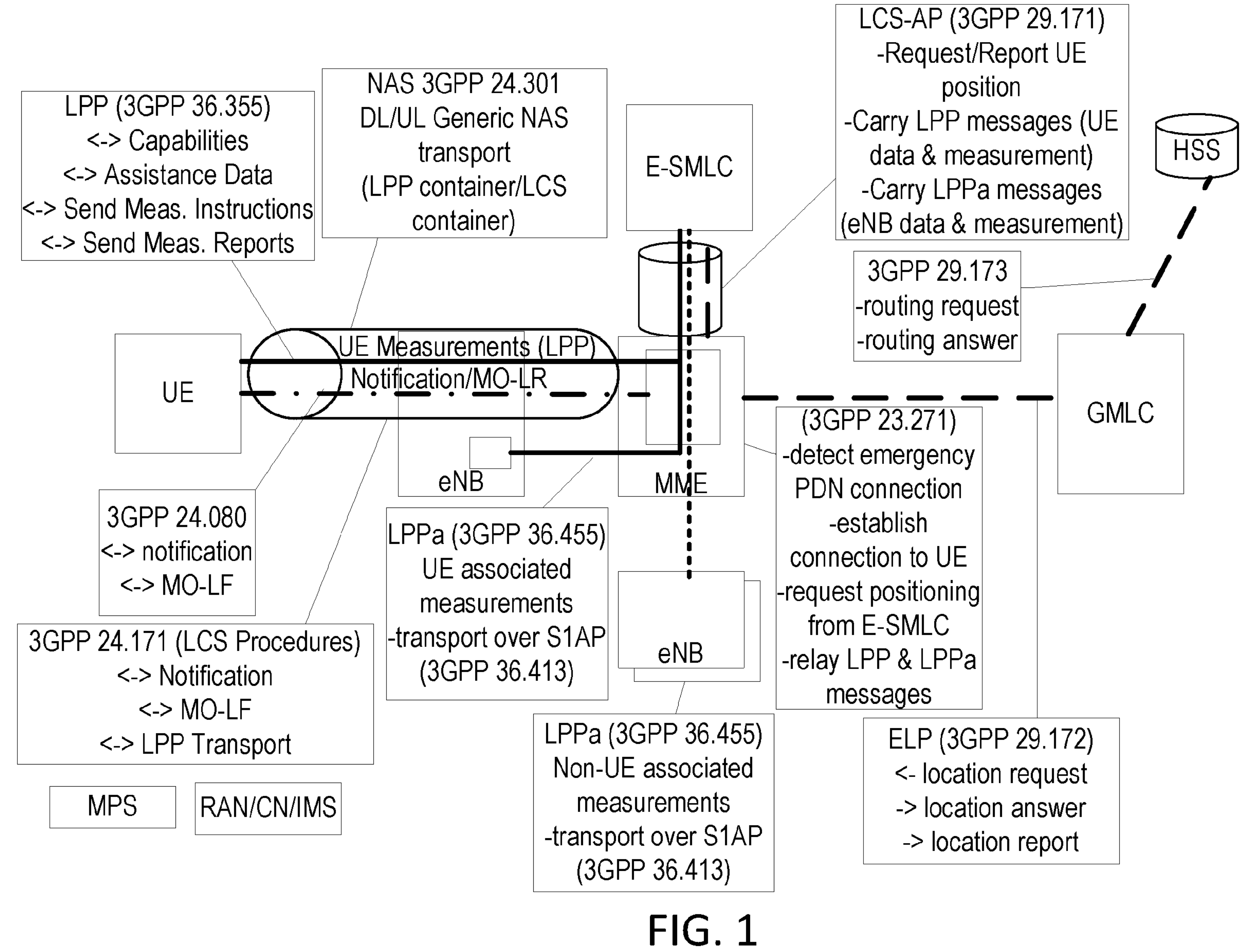
FIG. 1 is a diagram of a diagram of an LTE positioning architecture.
Figure 2:
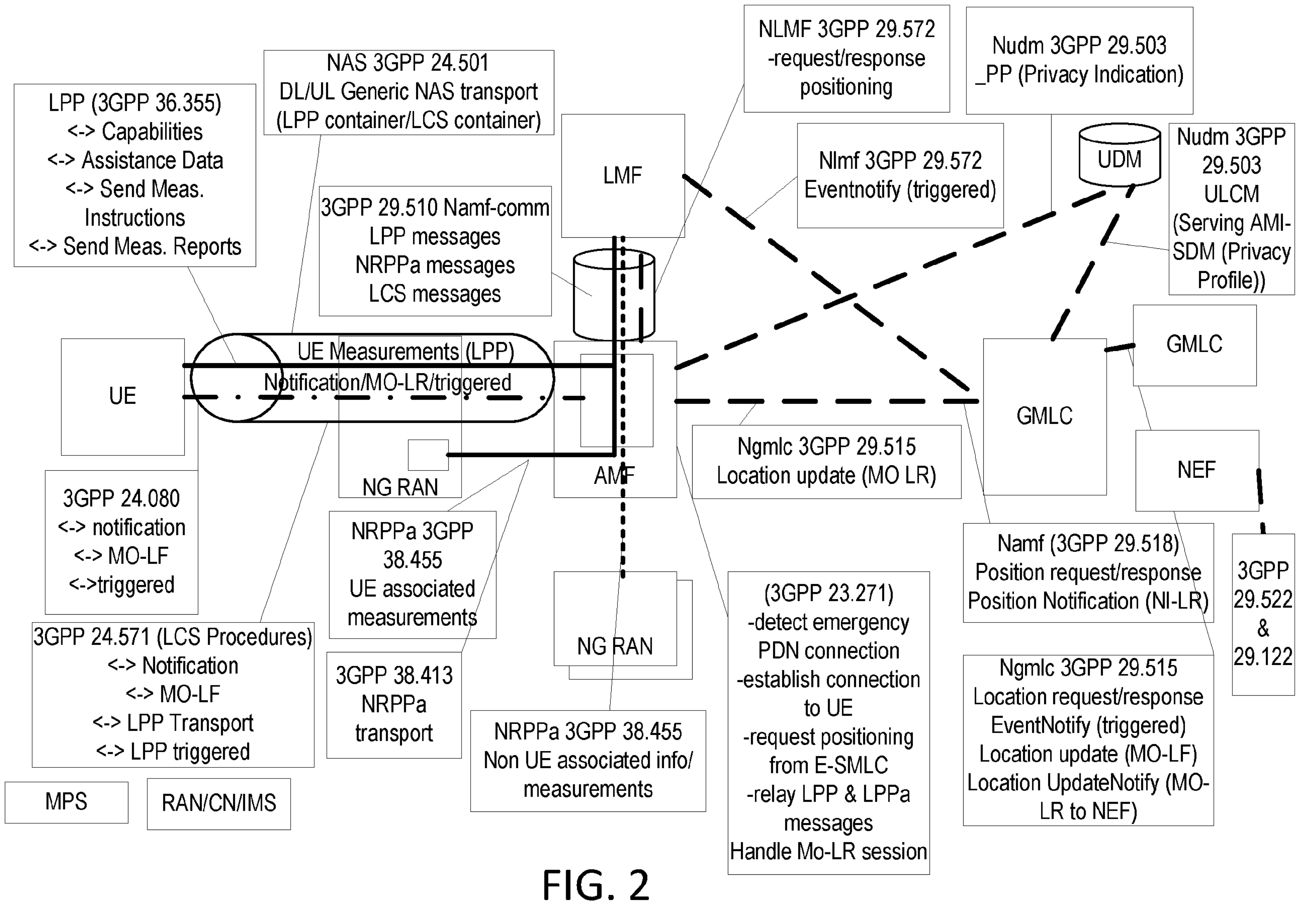
FIG. 2 is a diagram of a 5G positioning architecture.

Before describing in detail example embodiments, it is noted that the embodiments reside primarily in combinations of apparatus components and processing steps related to network actions based at least on co-hosted cell(s). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

The term "network function node" used herein can be any kind of a core network node (e.g., mobile management entity (MME), location management function (LMF), etc.).

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD. Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IoT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a network function node may be distributed over a plurality of network function nodes and/or network nodes. In other words, it is contemplated that the functions of the network function node described herein are not limited to performance by a single physical device and, in fact, can be distributed among several physical devices.

A cell may be generally a communication cell, e.g., of a cellular or mobile communication network, provided by a network node. A serving cell may be a cell on or via which a network node (the node providing or associated to the cell, e.g., base station, gNB or eNodeB) transmits and/or may transmit data (which may be data other than broadcast data) to a wireless device, in particular control and/or user or payload data, and/or via or on which a user equipment transmits and/or may transmit data to the node; a serving cell may be a cell for or on which the wireless device is configured and/or to which it is synchronized and/or has performed an access procedure, e.g., a random access procedure, and/or in relation to which it is in a RRC_connected or RRC_idle state, e.g., in case the node and/or user equipment and/or network follow the LTE-standard. One or more carriers (e.g., uplink and/or downlink carrier/s and/or a carrier for both uplink and downlink) may be associated to a cell. A network node may provide one or more cells.

Transmitting in downlink may pertain to transmission from the network or network node to the wireless device. Transmitting in uplink may pertain to transmission from the terminal to the network or network node. Transmitting in sidelink may pertain to (direct) transmission from one wireless device to another. Uplink, downlink and sidelink (e.g., sidelink transmission and reception) may be considered communication directions. In some variants, uplink and downlink may also be used to described wireless communication between network nodes, e.g., for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide network actions based at least on co-hosted cell(s).

Figure 3:
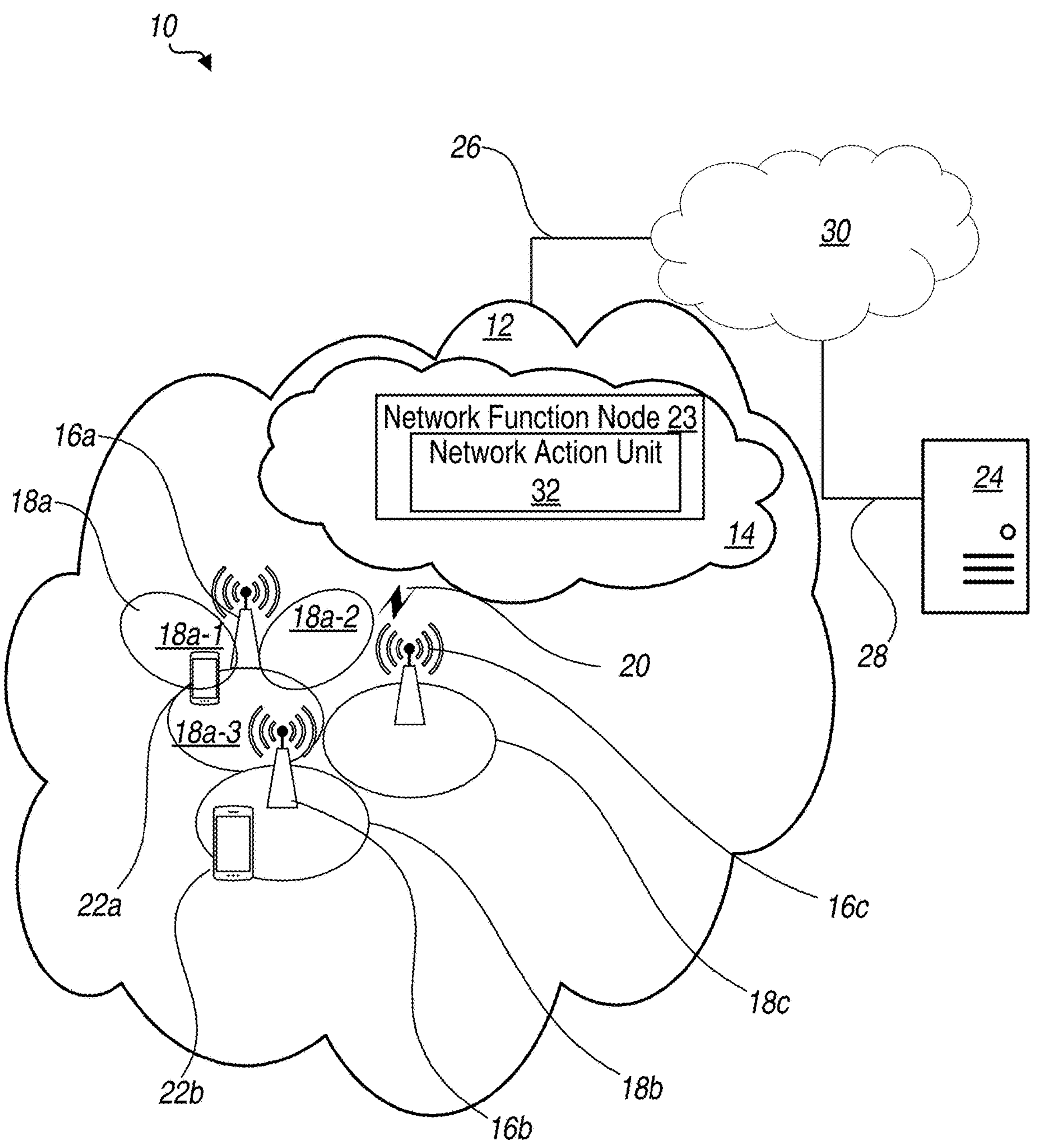
FIG. 3 is a schematic diagram of an example network architecture illustrating a communication system connected via an intermediate network to a host computer according to the principles in the present disclosure.

Referring now to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16*a*. 16*b*, 16*c* (referred to collectively as network nodes 16), such as NBs, eNBs, gNBs or other types of wireless access points, each defining a corresponding coverage area 18*a*-1 to 18*a*-3, 18*b*, 18*c* (referred to collectively as coverage areas 18). For example, network node 16*a* may host multiple cells or coverage areas 18*a*-1 to 18*a*-3 where cell/coverage area 18*a*-1 may be a serving cell for wireless device 22*a*.

Each network node 16*a*, 16*b*, 16*c* is connectable to the core network 14 over a wired or wireless connection 20. A first wireless device (WD) 22*a* located in coverage area 18*a* is configured to wirelessly connect to, or be paged by, the corresponding network node 16*a*. A second WD 22*b* in coverage area 18*b* is wirelessly connectable to the corresponding network node 16*b*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Core network 14 may include one or more network function nodes 23 for performing one or more core network functions. In one or more embodiments, the network function node 23 is a location management function (LMF) node/entity.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected WDs 22*a*, 22*b* and the host computer 24. The connectivity may be described as an over-the-top (OTT) connection. The host computer 24 and the connected WDs 22*a*, 22*b* are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22*a*. Similarly, the network node 16 need not be aware of the future routing of an outgoing uplink communication originating from the WD 22*a* towards the host computer 24.

A network function node is configured to include a network action unit 32 which is configured to perform one or more network function node functions as described herein such as with respect to network actions based at least on co-hosted cell(s).

Example implementations, in accordance with an embodiment, of the network node 16, network function node 23 and host computer 24 discussed in the preceding paragraphs will now be described with reference to FIG. 4. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to receive, transmit, process, determine, relay, forward, store, analysis, etc., information related to network actions based at least on co-hosted cell(s).

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16.

The communication system 10 further includes the network function node 23 already referred to. The network function node 23 may have hardware 80 that may include a communication interface 82 configured to set up and maintain a connection 64 with a network node 16. The communication interface 82 may be formed as or may include, for example, one or more RF transmitters, one or more RF receivers, and/or one or more RF transceivers.

The hardware 80 of the network function node 23 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of computer readable storage medium such as volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory) and/or non-transitory computer readable storage medium.

Thus, the network function node 23 may further comprise software 90, which is stored in, for example, memory 88 at the WD 22, or stored in external memory (e.g., database, storage array, network storage device, etc.) accessible by the WD 22. The software 90 may be executable by the processing circuitry 84.

The processing circuitry 84 may be configured to control any of the methods and/or processes described herein and/or to cause such methods, and/or processes to be performed, e.g., by network function node 23. The processor 86 corresponds to one or more processors 86 for performing network function node 23 functions described herein. The network function node 23 includes memory 88 that is configured to store data, programmatic software code and/or other information described herein. In some embodiments, the software 90 may include instructions that, when executed by the processor 86 and/or processing circuitry 84, causes the processor 86 and/or processing circuitry 84 to perform the processes described herein with respect to network function node 23. For example, the processing circuitry 84 of the network function node 23 may include a network action unit 32 configured to perform one or more network function node functions as described herein such as with respect to network actions based at least on co-hosted cell(s).

Figure 4:
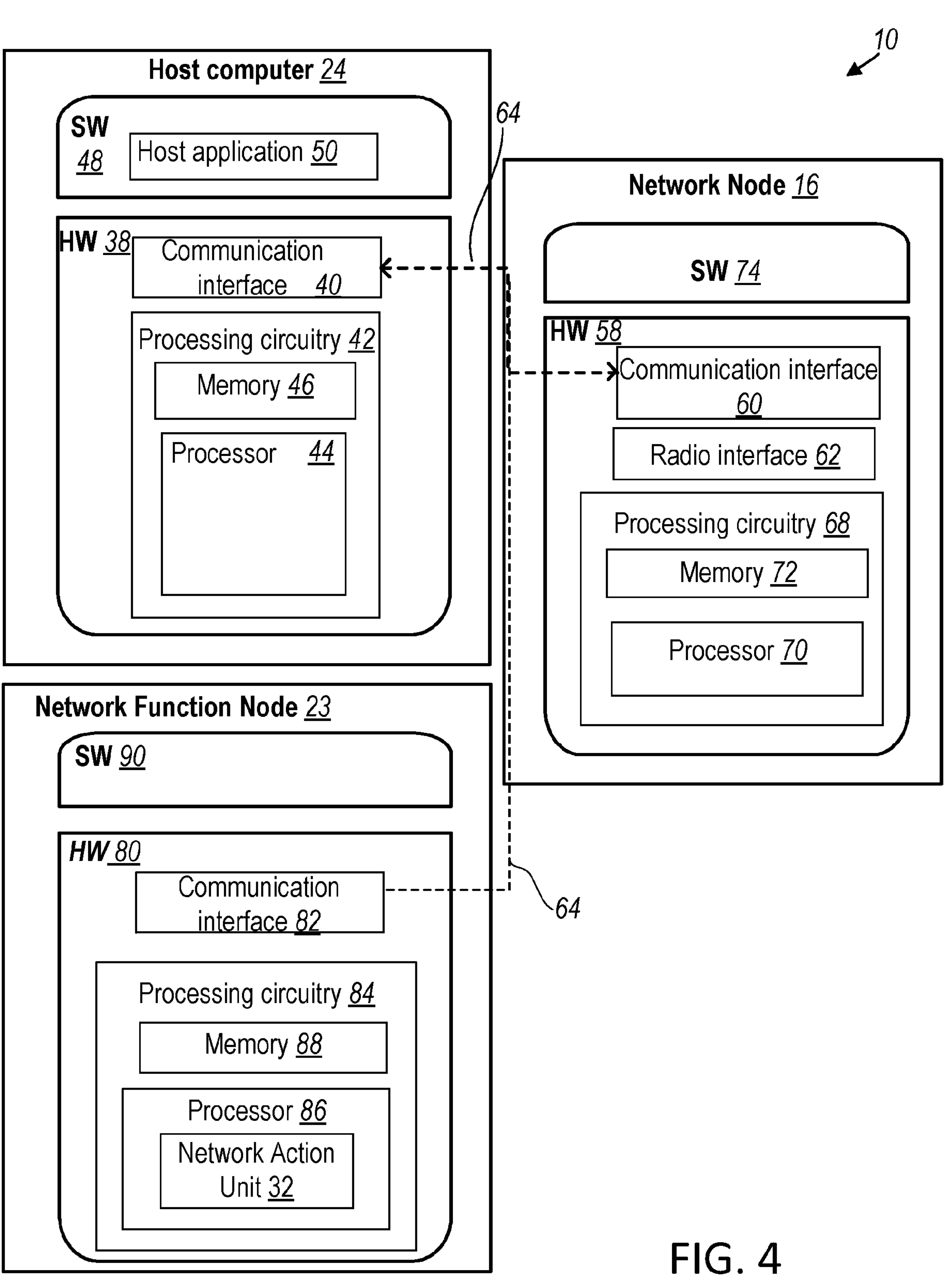
FIG. 4 is a block diagram of a host computer communicating via a network node with a wireless device over an at least partially wireless connection according to some embodiments of the present disclosure.

In some embodiments, the inner workings of the network node 16, network node function 23, and host computer 24 may be as shown in FIG. 4 and independently, the surrounding network topology may be that of FIG. 3.

In FIG. 4, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors, etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a communication interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 3 and 4 show a "unit" such as network action unit 32 as being within a respective processor, it is contemplated that this unit may be implemented such that a portion of the unit is stored in a corresponding memory within the processing circuitry. In other words, the units may be implemented in hardware or in a combination of hardware and software within the processing circuitry.

Figures 5, 6:
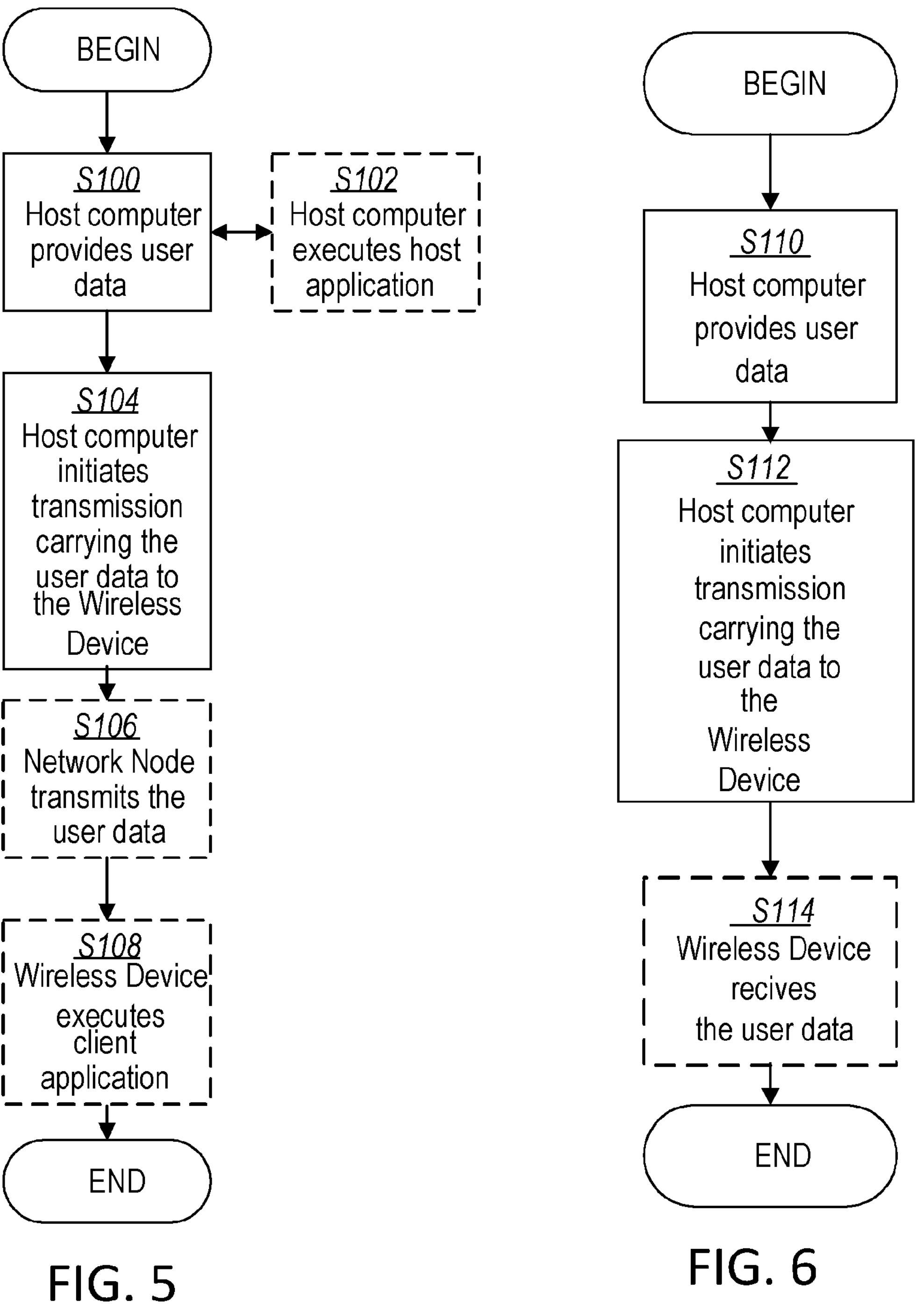
FIG. 5 is a flowchart illustrating example methods implemented in a communication system including a host computer, a network node and a wireless device for executing a client application at a wireless device according to some embodiments of the present disclosure.
FIG. 6 is a flowchart illustrating example methods implemented in a communication system including a host computer, a network node and a wireless device for receiving user data at a wireless device according to some embodiments of the present disclosure.

FIG. 5 is a flowchart illustrating an example method implemented in a communication system, such as, for example, the communication system of FIGS. 3 and 4, in accordance with one embodiment. The communication system may include a host computer 24, a network node 16, network node function 23 and a WD 22, which may be those described with reference to FIG. 4. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application associated with the host application 50 executed by the host computer 24 (Block S108). The client application may be stored at WD 22 and operable to provide a service to a human or non-human user via the WD 22, with the support of the host computer 24, and/or other WD 22 functions described herein. The client application may interact with the user to generate the user data that it provides.

FIG. 6 is a flowchart illustrating an example method implemented in a communication system, such as, for example, the communication system of FIG. 3, in accordance with one embodiment. The communication system may include a host computer 24, a network node 16, network node function 23 and a WD 22, which may be those described with reference to FIGS. 3 and 4. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 7, 8:
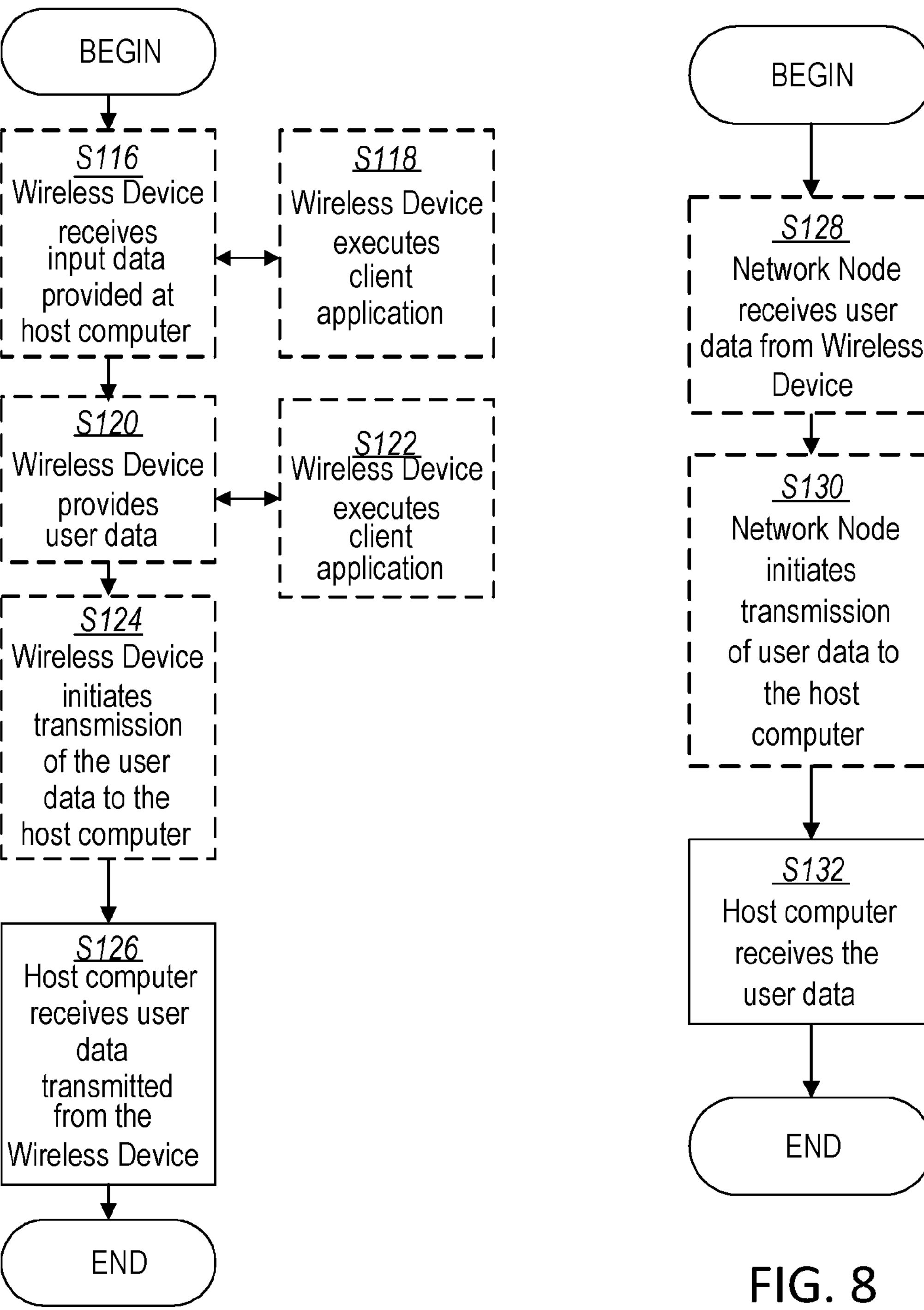
FIG. 7 is a flowchart illustrating example methods implemented in a communication system including a host computer, a network node and a wireless device for receiving user data from the wireless device at a host computer according to some embodiments of the present disclosure.
FIG. 8 is a flowchart illustrating example methods implemented in a communication system including a host computer, a network node and a wireless device for receiving user data at a host computer according to some embodiments of the present disclosure.

FIG. 7 is a flowchart illustrating an example method implemented in a communication system, such as, for example, the communication system of FIG. 3, in accordance with one embodiment. The communication system may include a host computer 24, a network node 16, network node function 23 and a WD 22, which may be those described with reference to FIGS. 3 and 4. In an optional first step of the method, the WD 22 receives input data provided by the host computer 24 (Block S116). In an optional substep of the first step, the WD 22 executes the client application which provides the user data in reaction to the received input data provided by the host computer 24 (Block S118). Additionally or alternatively, in an optional second step, the WD 22 provides user data (Block S120). In an optional substep of the second step, the WD provides the user data by executing a client application (Block S122). In providing the user data, the executed client application may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 8 is a flowchart illustrating an example method implemented in a communication system, such as, for example, the communication system of FIG. 3, in accordance with one embodiment. The communication system may include a host computer 24, a network node 16, network node function 23 and a WD 22, which may be those described with reference to FIGS. 3 and 4. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

FIG. 9 is a flowchart of an example process in a network function node 23 according to some embodiments of the present disclosure. One or more blocks described herein may be performed by one or more elements of network node function 23 such as by one or more of processing circuitry 84 (including the network action unit 32), processor 86 and/or communication interface 82. Network function node 23 is configured to receive (Block S134) a request for performing a network action where the request includes an access network cell identity that includes a network node identifier associated with a network node 16 and a serving cell identifier associated with a serving cell 18, and a bit length of the network node identifier, as described herein. Network function node 23 is configured to determine (Block S136) the network node identifier based at least on the bit length of the network node identifier, as described herein. Network function node 23 is configured to identify (Block S138) a plurality of cells 18 other than the serving cell that are hosted by the network node 16 based on the determined network node identifier, as described herein.

Network function node 23 is configured to estimate (Block S140) a respective coverage area for each of the plurality of cells 18, as described herein. Network function node 23 is configured to estimate (Block S142) a coverage area of the serving cell 18 based at least on the estimates of the respective coverage areas of the plurality of cells 18, as described herein. Network function node 23 is configured to perform (Block S144) the requested network action based at least on the estimated coverage area of the serving cell 18, as described herein.

According to one or more embodiments, the processing circuitry 84 is further configured to attempt to retrieve serving cell information using the serving cell identifier, where the estimating of the coverage area of the serving cell 18 is performed after a failure to retrieve serving cell information using the serving cell identifier. According to one or more embodiments, the processing circuitry 84 is further configured to attempt to retrieve serving cell information using the serving cell identifier where the estimating of the coverage area of the serving cell 18 is performed after retrieving serving cell information using the serving cell identifier. According to one or more embodiments, the requested network action includes determining whether an estimated wireless device 22 position is within the estimated coverage area of serving cell 18.

According to one or more embodiments, the processing circuitry 84 is configured to respond to the request by returning estimated wireless device 22 position for the wireless device 22 if the estimated wireless device 22 position is within the estimated coverage area of the serving cell 18. According to one or more embodiments, the estimated coverage area of the serving cell includes a preconfigured tolerance range. According to one or more embodiments, the estimated wireless device 22 position is based on one of location information and measurements received from the wireless device 22. According to one or more embodiments, the requested network action includes a location services, LCS, positioning action. According to one or more embodiments, a bit length of a network node identifier included in the access network cell identity varies based on a network node 16 being identified where the network node identifier is undecodable from the network node identifier without the bit length of the network node identifier that is received.

According to one or more embodiments, the estimating of the coverage area of the serving cell 18 is based at least on a lack of network node coverage, in a portion of an area served by the network node 16, that results from mapping the coverage area of the plurality of cells 18 without mapping the coverage area for the serving cell 18. According to one or more embodiments, at least one of the plurality of cells 18 is a neighbor cell 18 to the serving cell 18. According to one or more embodiments, the network function node 23 is a location management function, LMF, node.

Having described the general process flow of arrangements of the disclosure and having provided examples of hardware and software arrangements for implementing the processes and functions of the disclosure, the sections below provide details and examples of arrangements for network actions based at least on co-hosted cell(s).

Some embodiments provide network actions based at least on co-hosted cell(s). One or more network function node 23 functions described below may be performed by one or more of processing circuitry 84 (including the network action unit 32), processor 86 and/or communication interface 82.

Enhanced Sanity Check

The network function node 23 (e.g., SMLC or LMF) is configured to use the central point of one of the cells 18 in the same network node 16 plus a pre-configured distance tolerance value/range to generate a sanity check shape. For example, the central point may correspond to a central point of a serving cell 18 where the shape/coverage area of the serving cell is determined/generated based at least on the coverage areas of the other cells hosted by the network node 16 without using serving cell information, which may not be available in a database or memory 88 of network function node 23. In some embodiments the generated shape/coverage area of the serving cell may include an offset that may increase the coverage area. The network function node 23 is configured to then compare the positioning result (i.e., location data or processed measurement data, which indication a geographical position of wireless device 22) to the generated shape of the serving cell 18. If the positioning result is determined to not be within the sanity check shape (i.e., not within a generated shape), the sanity check will fail. For instance, if the tolerant range is configured to 30 km (e.g., 30 km radius include offset), as long as the central point of positioning result is not 30 km (configurable) away from the central point of the sanity check shape, the network function node 16 (e.g., positioning platform SMLC/LMF) determines the positioning result passes the sanity check.

Enhanced sanity check (also referred to "sanity check") is a "rough" sanity check method. For example, "rough" may refer to less accuracy when compared to a sanity check performed having the serving cell information such that the "rough sanity check" is considered to be performed at a level higher than the serving cell level. The check range can be in city, province/state or even country level.

Some embodiments described herein may improve the positioning compared to situations where serving cell information is not available and even in situations where serving cell information is available (i.e., provides added verification) in the following two circumstances:

When the wireless device 22's serving cell information cannot be obtained from a database associated with the network function node 23 (e.g., E-SMLC/LMF), the system or wireless device 22 or user could (or only) choose if the enhanced cell-based sanity check should be used as an option, as described herein.

When the wireless device 22's serving cell information cannot be obtained from a database associated with the network function node 23 (e.g., E-SMLC/LMF), the enhanced sanity check (i.e., cell based sanity check) may be used to validate the final positioning result, as described herein.

The one or more embodiments described herein are not limited to a certain positioning method (e.g., network action), and are applicable to all positioning methods with geographic location produced by, for example, E-SMLC/LMF. Further, the teachings described herein are equally applicable to other network actions where a coverage area of a serving cell 18 is estimated using one or more neighbour cells 18, and estimated coverage area of the serving cell 18 is used to performed the network action. Also, the teachings described herein are equally applicable to a 2G/3G network.

DL/DBH/UBP are based on 3GPP LTE Positioning Protocol (LPP) and OMA LPP Extensions (LPPe) on wireless device 22 communication, and based on 3GPP LCS-AP on core network 14 communication.

In 4G positioning, LPP and LPPe protocols are used between wireless device 22 and network function node 23 (e.g., E-SMLC). LCS-AP is used between the serving MME and E-SMLC. LPPa is used between serving network node 16 and E-SMLC. The positioning request sent to E-SMLC message from MME is LocationRequest( ).

In 5G positioning, LPP and LPPe are used between wireless device 22 and network function node 23 (e.g., LMF). Nlmf-Request/Response positioning and Nmlf-EventNotify messages are used for the communication between AMF between LMF and AMF. The positioning request sent to LMF message is Nlmf_Location_Determine-Location( ) based on 3GPP Location Services (LCS) architecture.

The supported interfaces may include one or more of:

LCS-AP messages to MME for the LTE CP positioning (LTE)

Nlmf-Request/Response positioning and Nmlf-EventNotify to AMF for the LTE CP positioning(5G)

LPP to wireless device 22 for the LTE and 5G CP positioning

LPPa to network node 16 for the LTE CP positioning

SFTP to Performance Management system (Optima) for statistics data and positioning records processing SNMPv3 to OSS/NMS for alarms Interface to assistance data provider for GPS and GLONASS assistant data FIG. 10 is an example signaling diagram for end-to-end flow of an emergency positioning, for example, the NI-LR Standard for Emergency Call in the LTE Network, according to one or more embodiments. The steps of FIG. 10, as described in detail below (the numbers below correspond to the identically numbered steps in FIG. 10).

1. Emergency attach or set up emergency bearer—For the emergency call requested by a user, the wireless device 22 performs emergency attach if not attached to a network node 16 or requests emergency PDN connection if already attached.
2. Location Request—The MME selects a network function node 23 (e.g., Evolved-Serving Mobile Location Center (E-SMLC)), and sends a Location Request message to the selected E-SMLC.
3. Positioning methods—The E-SMLC determines the positioning methods, and triggers the particular message sequence for the positioning methods. For example, the positioning method may include performing the process of any one of FIG. 9.
4. Location response—When a location estimate best satisfying the requested QoS has been obtained via location information or from wireless device 22 measurements, for example, the E-SMLC returns the location estimate to the MME server in a Location Response.
5. Subscriber location report—The MME sends a Subscriber Location Report (SLR) to the GMPC which carries the MSISDN/IMSI/IMEI of the wireless device 22, the event type "EMERGENCY_CALL_ORIGINATION", the ECGI, and optionally the location estimate, and the age.

Note: After receiving SLR from the MME, the GMPC can cache the MME address, the ECGI, and MSISDN/IMEI/IMSI. The caching function may be conditional depending on the GMPC configurations.
6. Subscriber location report ack—The GMPC acknowledges receipt of the location information to the MME.
7. MLP emerep—Step 7 is a conditional or optional step depending on the GMPC configurations. The GMPC forwards the location information received in Step 5 to the emergency services LCS Client.

After Step 7, if no location estimate is received or the location estimate received from the MME cannot fulfill the QoS requirement, the GMPC may send a location request to the MME, see Step 8 to Step 13, which are conditional steps depending on the GMPC configurations.

8. Provide subscriber location request—The GMPC sends a Provide Subscriber Location (PSL) message to the MME to get the location of wireless device 22.
9. Location request—The MME sends a Location Request message to the selected E-SMLC.
10. Positioning methods—The E-SMLC determines the positioning methods and triggers the particular message sequence for the methods. For example, the positioning method may include performing the process of FIG. 9.
11. Location response—When an obtained location estimate meets or satisfies the requested QoS and passed the sanity check (i.e., passed the enhanced sanity check), the E-SMLC returns it to the MME in a Location Response.
12. Provide subscriber location response—The MME returns the PSL response message to the GMPC with location information. In case a handover occurs, such as inter-MME or from MME to MSC with Single Radio Voice Call Continuity (SRVCC), the MME can return the new serving node address (MME or MSC) and the ECGI in the PSL response. Then the GMPC can update the cache with the new serving node address and ECGI if the cache is enabled.

13. MLP emerep—The GMPC might forward the location information received in Step 12 to the emergency services LCS Client.
14. Subscriber location response (handover)—If the handover occurs, the original MME or the new serving MME sends a SLR message to the GMPC including the MSISDN/IMEI/IMSI of the wireless device 22, the event type "EMERGENCY_CALL_HANDOVER", the ECGI, the location estimate, the age, and the new serving node address.
    Note: After receiving the SLR from the MME, the GMPC can cache the serving node address (the MME or MSC address), ECGI, and MSISDN/IMEI/IMSI. The cache function is conditional depending on the GMPC configurations.
15. Subscriber location report Ack—The GMPC acknowledges receipt of the SLR to the MME.
16. MLP emerep—The GMPC forwards the location information received in Step 15 to the emergency services LCS Client.
    Note: This step is a conditional or optional step that may depend or be based on the GMPC configuration.
17. Subscriber location report (release)—When the emergency call is released, the MME sends a SLR with the event type "EMERGENCY_CALL_RELEASE" to the GMPC indicating that the emergency call has been terminated. The GMPC then clears the serving node address and ECGI cache for this MSISDN/IMEI/IMSI.
18. Subscriber location report ack—The GMPC acknowledges receipt of the SLR to the MME.

Figure 11:
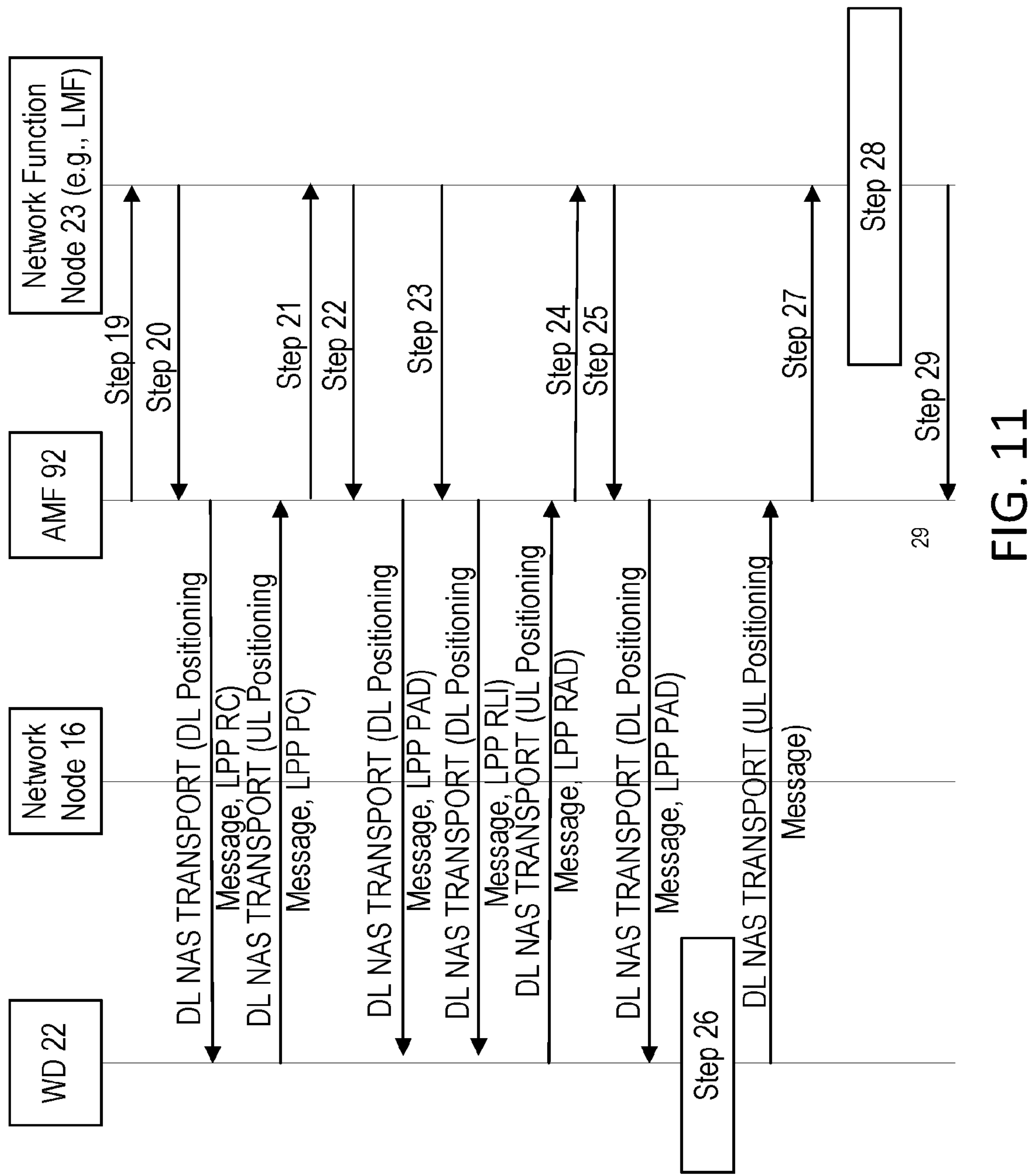
FIG. 11 is a signaling diagram of a 5G positioning procedure according to some embodiments of the present disclosure.

FIG. 11 is a signaling diagram of a 3GPP 5G positioning procedure according to some embodiments of the disclosure. The steps are described in detail below (the numbers below correspond to the identically numbered steps in FIG. 11).

19. Nlmf_Location_DetermineLocationRequest—The AMF 92 selects a network function node 23 (e.g., LMF) instance based on an NRF query or the configuration, and invokes the Nlmf_Location_DetermineLocation service operation toward the LMF to request the current location of the wireless device 22. The service operation includes an LCS correlation identifier, the serving NR CID, network node identifier length or bit length of the network node identifier (i.e., gNB length) and the client type.

The AMF 92 identity may be included if Step 20 to Step 27 are used.

20. Namf_Communication_N1N2MessageTrasnfer (<ueContextId> LPPRequestCapabilities)—If any LPP-based positioning method is enabled, the LMF sends the LPP RequestCapabilities message to the wireless device 22.

The LMF invokes the Namf_Communication_N1N2MessageTransfer service operation toward the AMF 92 to transfer a Downlink Positioning Message to the wireless device 22 and includes the LPP binary data as the N1 message content. The AMF 92 forwards the Downlink Positioning Message to the wireless device 22 in a DOWNLINK NAS TRANSPORT message.

21. Namf_Communication_N1MessageNotify (<ueContextId>, LPP ProvideCapabilities)—The wireless device 22 returns the LPP ProvideCapabilities message to the LMF with wireless device positioning capabilities.

The wireless device 22 sends back an Uplink Positioning Message to the AMF 92 included in a NAS Transport message. Then, the AMF 92 invokes the Namf_Communication_N1MessageNotify service operation toward the LMF, including the Uplink Positioning Message received from the wireless device 22 and the LCS correlation identifier.

For all LPP messages exchanged between the LMF and the wireless device 22, the AMF 92 repeats Step 20 and Step 21.

22. Namf_communication_N1N2MessageTrasnfer (<ueContextId>, LPPProvidedAssistanceData)—The LMF selects the positioning method based on the wireless device positioning capabilities, the positioning method configurations, and the parameters included in the Location Request message.
23. Namf_communication_N1N2MessageTransfer(<ueContextId>, LPPRequestLocationinfo)—The LMF sends an LPP RequestLocationInformation message to the wireless device 22 to get the measurement data or the location estimate.
24. Namf_Communication_N1N2MessageTransfer (<ueContextId>, LPPRequestAssistance Data)—The wireless device 22 might request more assistance data from the LMF by sending an LPP RequestAssistanceData message.
25. Namf_Communication_N1N2MessageTransfer (<ueContextId>, LPPProvideAssistanceData)—The LMF delivers the assistance data requested by the wireless device 22 in an LPP ProvideAssistanceData message.

Step 24 and Step 25 can be repeated if more A-GNSS assistance data is needed.

26. Location measurement or location computation—The wireless device 22 performs any positioning or sensor measurements, location computation, or both, requested by the LMF.
27. Namf_Communication_N1MessageNotify (<ueContextId>, LPPProvideLocationinfo)—The wireless device 22 returns an LPP ProvideLocationInformation message to the LMF, which includes either GNSS measurements (WD-assisted) or a location estimate (WD-based).
28. Location calculation and result processing—The wireless device 22 returns an LPPe ProvideLocationInformation message to the LMF, which includes either GNSS measurements (WD-assisted) or a location estimate (WD-based).
29. Nlmf_Location_DetermineLocationResponse (loc-estimate)—The LMF processes the location information returned from the wireless device 22. For the WD-assisted A-GNSS method, the LMF calculates a position estimate from the measurements. LMF verifies the positioning result based on the sanity check configuration.
    LMF returns the Nlmf_Location_DetermineLocation service operation to the AMF 92 with error or location data and accuracy based on the sanity check result.

Therefore, in case of positioning during an emergency, the system is still able to perform a sanity check that returns location data even if serving cell information is not available or retrievable.

Figure 12:
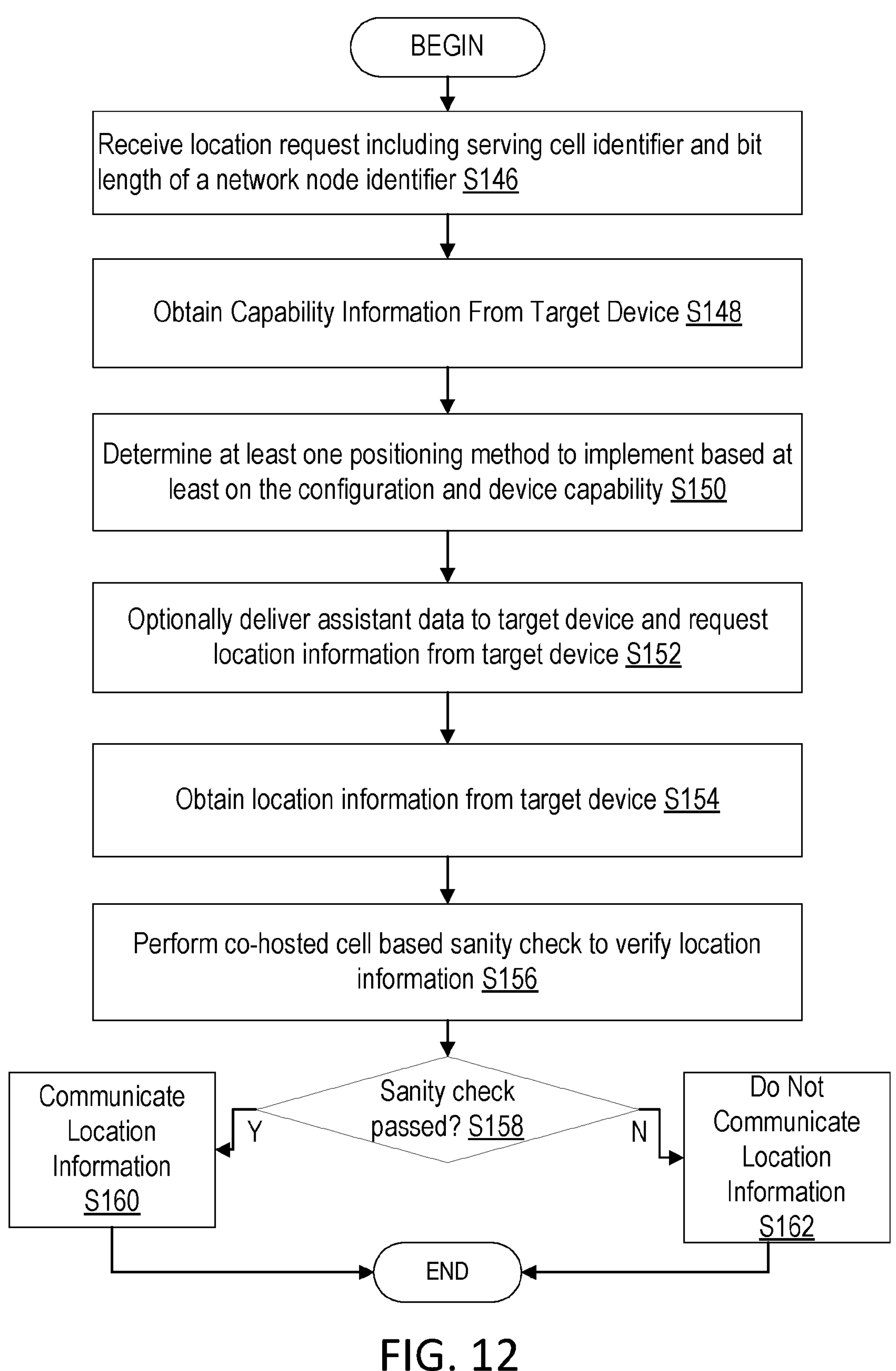
FIG. 12 is a flowchart of another example process in the network function node according to some embodiments of the present disclosure.

FIG. 12 is a flowchart of an example process in a network function node according to some embodiments of the present disclosure. One or more blocks described herein may be performed by one or more elements of network node 16 such as by one or more of processing circuitry 68 (including the network action unit 32), processor 70, radio interface 62 and/or communication interface 60. Network function node 23 is configured to receive (Block S146) a location request including a serving cell identifier and bit length of the network node identifier, as described herein. Network function node 23 is configured to obtain (Block S148) capability information from a target device (e.g., wireless device 22), as described herein.

Network function node 23 is configured to determine (Block S150) at least one positioning method to implement based at least on configuration information and capability information, as described herein. Network function node 23 is configured to optionally deliver (Block S152) assistant data to the target device and request location information from the target device, as described herein. Network function node 23 is configured to obtain (Block S154) location information from the target device as described herein.

Network functions node 23 is configured to perform (Block S156) co-hosted cell based sanity check to verify location information, as described herein. Network function node 23 is configured to determine (Block S158) whether the sanity check passed, as described herein. Network function node 23 is configured to communicate (S160) location information if the sanity check passed, as described herein. Network function node 23 is configured to make (Block S162) the determination not to communicate location information if the sanity check is not passed, as described herein.

Figure 13:
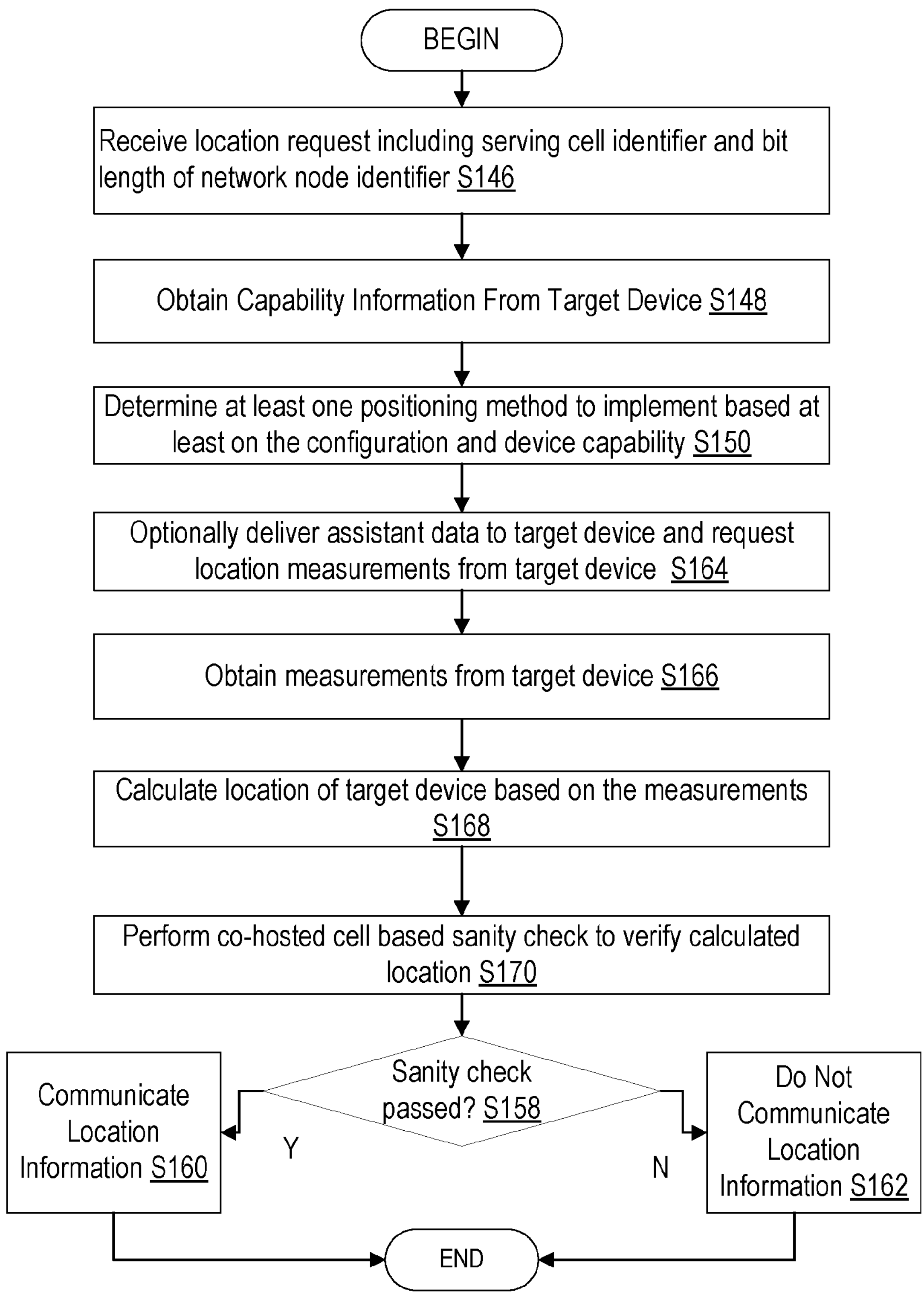
FIG. 13 is a flowchart of another example process in the network function node according to some embodiments of the present disclosure.

FIG. 13 is a flowchart of another example process in a network function node according to some embodiments of the present disclosure. One or more blocks described herein may be performed by one or more elements of network function node 23 such as by one or more of processing circuitry 84 (including the network action unit 32), processor 70, and/or communication interface 82. Network function node 23 is configured to perform Blocks S146-S150 that are described in FIG. 12. Network function node 23 is configured to optionally deliver (Block S164) assistant data to the target device and request location measurements from target device, as described herein. Network function node 23 is configured to obtain (Block S166) measurements from the target device, as described herein.

Network function node 23 is configured to calculate (Block S168) a location of the target device based on the measurements, as described herein. Network function node 23 is configured to perform (Block S170) co-hosted cell based sanity check to verify calculated location, as described herein. Network function node 23 is configured to perform Blocks S158 to S162 that are described above with respect to FIG. 12.

Figure 14:
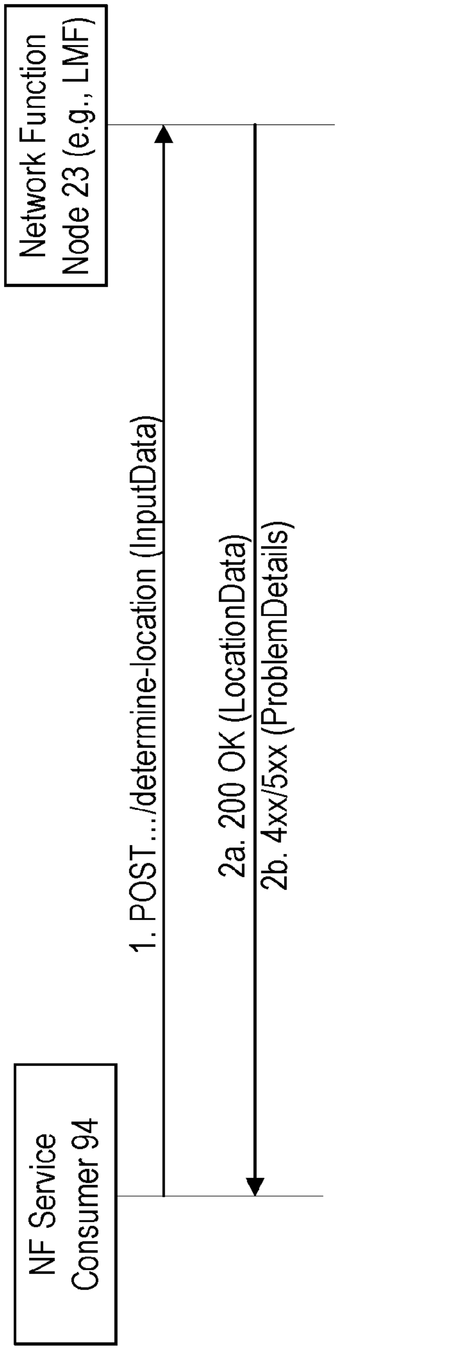
FIG. 14 is a signaling diagram according to some embodiments of the present disclosure.

A signaling diagram of the update to Chapter 5.2.2.2.2 of 3GPP TS 29.572 v16.3 is illustrated in FIG. 14. The NF Service Consumer 94 sends an HTTP POST request to the resource URI associated with the "determine-location" custom operation, i.e., to the network function node 23 (e.g., LMF). The input parameters for the request (e.g., one or more of: external client type, LCS correlation identifier, serving cell identifier, gNBIdLength of the serving cell, location QoS, supported GAD shapes, LDR Type, H-GMLC address, LDR Reference, UE connectivity state per access type . . . ) may be included in the HTTP POST request body. If WD LCS Capability is received in the request indicating LPP is not supported by the WD 22, the LMF may not send LPP messages to the WD 22 in subsequent positioning procedures. In some embodiments, the HTTP POST message may include any desired content, and the length of the network node identifier (i.e., gNBidLength parameter) can be added to the attributes list in, for example, Chapter 6.1.6.2.2—Type: InputData of 3GPP TS 29.572 v 16.3.

Figure 15:
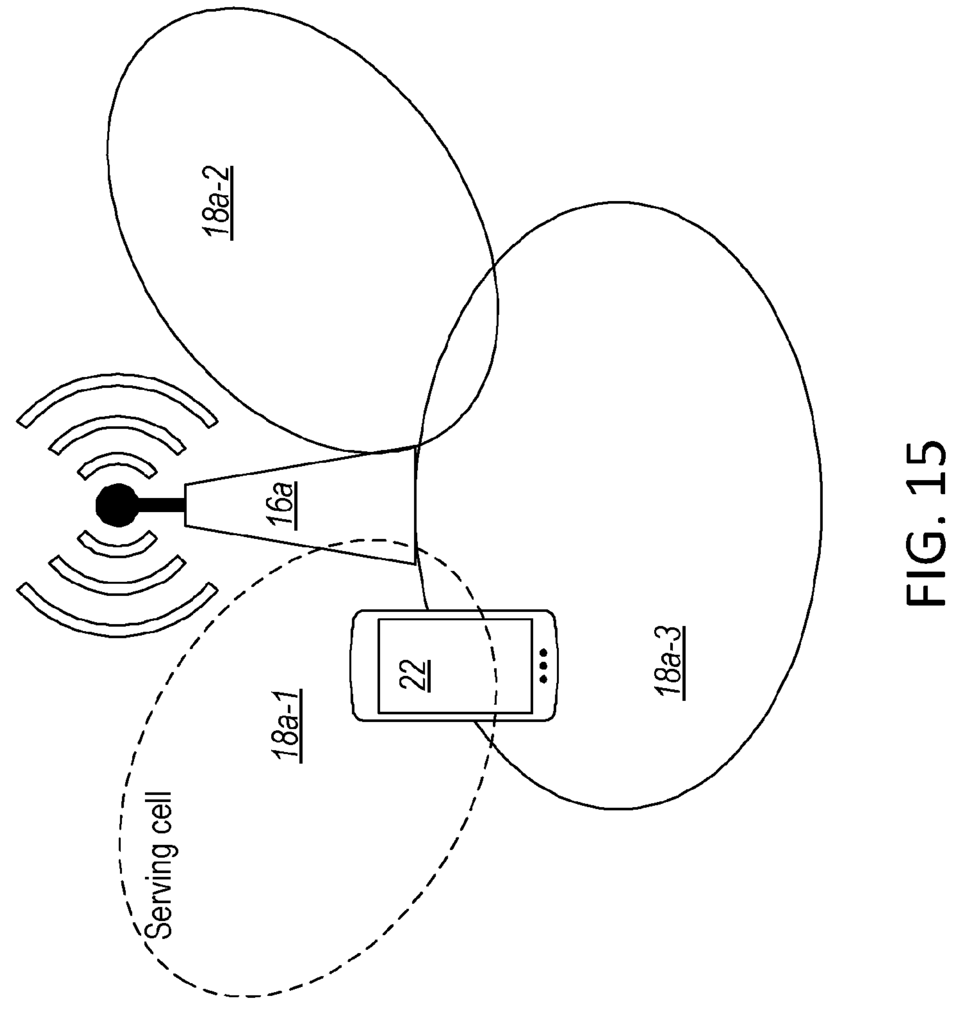
FIG. 15 is a diagram of an example of a portion of the communication system.

FIG. 15 is a diagram of an example system 10 where information for serving cell 18*a*-1 is not retrieval or does not exist in a database associated with network function node 23. In this example, network function node 23 determines the general coverage area of serving cell 18*a*-1 based on the coverage areas of cells 18*a*-2 and 18*a*-3, for example, where mapping coverages areas of cells 18*a*-2 and 18*a*-3 without mapping coverage area 18*a*-1 leaves a portion of the area serviced by network node 16*a* open or uncovered such that the network function node 23 is able to determine that serving cell 18*a*-1 likely services that area. Hence, a rough sanity check is provided where are more accurate sanity may not be available.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
|---|---|
| DBH | Device Based Hybrid |
| DL | Dispatchable Location |
| LMF | Location Management Function |
| NCI | NR cell identity |
| NEAD | National Emergency Address Database |
| UBP | Uncompensated Barometric Pressure |
| UE | User Equipment |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network function node, comprising:

processing circuitry configured to:

receive a request for performing a network action, the request including:

an access network cell identity that includes a network node identifier associated with a network node and a serving cell identifier associated with a serving cell; and a bit length of the network node identifier, the bit length of the network node identifier varying based on a network node being identified;

determine the identity of the network node identifier based at least on the bit length of the network node identifier;

identify a plurality of cells other than the serving cell that are hosted by the network node based on the determined identity of the network node;

estimate a respective coverage area for each of the plurality of cells;

estimate a coverage area of the serving cell based at least on the estimates of the respective coverage areas of the plurality of cells; and perform the requested network action based at least on the estimated coverage area of the serving cell.

2. The network function node of claim 1, wherein the processing circuitry is further configured to:

attempt to retrieve serving cell information using the serving cell identifier;

the estimating of the coverage area of the serving cell being performed after a failure to retrieve serving cell information using the serving cell identifier.

3. The network function node of claim 1, wherein the processing circuitry is further configured to:

attempt to retrieve serving cell information using the serving cell identifier;

the estimating of the coverage area of the serving cell being performed after retrieving serving cell information using the serving cell identifier.

4. The network function node of claim 1, wherein the requested network action includes determining whether an estimated wireless device position is within the estimated coverage area of serving cell.

5. The network function node of claim 4, wherein the processing circuitry is configured to respond to the request by returning estimated wireless device position for the wireless device if the estimated wireless device position is within the estimated coverage area of the serving cell.

6. The network function node of claim 5, wherein the estimated coverage area of the serving cell includes a preconfigured tolerance range.

7. The network function node of claim 4, wherein the estimated wireless device position is based on one of location information and measurements received from the wireless device.

8. The network function node of claim 1, wherein the requested network action includes a location services, LCS, positioning action.

9. The network function node of claim 1, the identity of the network node undecodable from the network node identifier without the bit length of the network node identifier that is received.

10. The network function node of claim 1, wherein the estimating of the coverage area of the serving cell is based at least on a lack of network node coverage, in a portion of an area served by the network node, that results from mapping the coverage area of the plurality of cells without mapping the coverage area for the serving cell.

11. The network function node of claim 1, wherein at least one of the plurality of cells is a neighbor cell to the serving cell.

12. The network function node of claim 1, wherein the network function node is a location management function, LMF, node.

13. A method implemented by a network function node, the method comprising:

receiving a request for performing a network action, the request including:

an access network cell identity that includes a network node identifier associated with a network node and a serving cell identifier associated with a serving cell; and a bit length of the network node identifier, the bit length of the network node identifier varying based on a network node being identified;

determining the identity of the network node based at least on the bit length of the network node identifier;

identifying a plurality of cells other than the serving cell that are hosted by the network node based on the determined identity of the network node;

estimating a respective coverage area for each of the plurality of cells;

estimating a coverage area of the serving cell based at least on the estimates of the respective coverage areas of the plurality of cells; and performing the requested network action based at least on the estimated coverage area of the serving cell.

14. The method of claim 13, further comprising:

attempting to retrieve serving cell information using the serving cell identifier; and the estimating of the coverage area of the serving cell being performed after a failure to retrieve serving cell information using the serving cell identifier.

15. The method of claim 13, further comprising:

attempting to retrieve serving cell information using the serving cell identifier; and the estimating of the coverage area of the serving cell being performed after retrieving serving cell information using the serving cell identifier.

16. The method of claim 13, wherein the requested network action includes determining whether an estimated wireless device position is within the estimated coverage area of serving cell.

17. The method of claim 16, wherein the estimated coverage area of the serving cell includes a preconfigured tolerance range.

18. The method of any one of claim 15, further comprising responding to the request by returning estimated wireless device position for the wireless device if the estimated wireless device position is within the estimated coverage area of the serving cell.

19. The method of claim 16, wherein the estimated wireless device position is based on one of location information and measurements received from the wireless device.

20. The method of claim 13, wherein the requested network action includes a location services, LCS, positioning action.

21. The method of claim 13, the identity of the network node undecodable from the network node identifier without the bit length of the network node identifier that is received.

22. The method of claim 13, wherein the estimating of the coverage area of the serving cell is based at least on a lack of network node coverage, in a portion of an area served by the network node, that results from mapping the coverage area of the plurality of cells without mapping the coverage area for the serving cell.

23. The method of claim 13, wherein at least one of the plurality of cells is a neighbor cell to the serving cell.

24. The method of claim 13, wherein the network function node is a location management function, LMF, node.

25. A non-transitory computer readable storage medium including instructions, which when executed by a processor, cause the processor to:

receive a request for performing a network action, the request including:

an access network cell identity that includes a network node identifier associated with a network node and a serving cell identifier associated with a serving cell; and a bit length of the network node identifier, the bit length of the network node identifier varying based on a network node being identified;

determine the identity of the network node identifier based at least on the bit length of the network node identifier;

identify a plurality of cells other than the serving cell that are hosted by the network node based on the determined identity of the network node;

estimate a respective coverage area for each of the plurality of cells;

estimate a coverage area of the serving cell based at least on the estimates of the respective coverage areas of the plurality of cells; and perform the requested network action based at least on the estimated coverage area of the serving cell.

* * * * *